US005375745A

United States Patent [19]

Ritsche

[11] Patent Number: 5,375,745

[45] Date of Patent: Dec. 27, 1994

[54] MEDIA DISPENSER WITH INITIAL PRESSURE-RELIEF STATE

[75] Inventor: Stefan Ritsche, Radolfzell, Germany

[73] Assignee: Ing. Erich Pfeiffer GmbH & Co. KG, Radolfzell, Germany

[21] Appl. No.: 940,442

[22] Filed: Sep. 4, 1992

[30] Foreign Application Priority Data

Sep. 5, 1991 [DE] Germany ............................ 4129474

[51] Int. Cl.[5] ............................................ G01F 11/36

[52] U.S. Cl. .................................... 222/321; 222/341; 222/385

[58] Field of Search ............... 222/321, 340, 341, 383, 222/385; 233/333

[56] References Cited

U.S. PATENT DOCUMENTS

| | | | |
|---|---|---|---|
| 3,796,375 | 3/1974 | Boris | 222/321 X |
| 3,940,070 | 2/1976 | Boris | 239/333 |
| 4,361,255 | 11/1982 | Saito et al. | 222/383 X |
| 4,389,003 | 6/1983 | Meshberg | 222/321 |
| 5,002,207 | 3/1991 | Giuffredi | 222/340 |
| 5,096,097 | 3/1992 | Lina | 222/321 X |

FOREIGN PATENT DOCUMENTS

| | | | |
|---|---|---|---|
| 0199143 | 10/1986 | European Pat. Off. | 222/321 |
| 0289854 | 4/1988 | European Pat. Off. . | |
| 342651 | 11/1989 | European Pat. Off. . | |
| 96205 | 5/1972 | France . | |
| 1504068 | 9/1969 | Germany . | |
| 1813421 | 7/1970 | Germany . | |
| 2313820 | 9/1973 | Germany . | |
| 3715300 | 11/1988 | Germany . | |
| 0199862 | 8/1989 | Japan | 222/321 |
| 2110771 | 6/1983 | United Kingdom . | |

*Primary Examiner*—Andres Kashnikow
*Assistant Examiner*—Joseph A. Kaufman
*Attorney, Agent, or Firm*—Quarles & Brady

[57] ABSTRACT

A discharge apparatus (1*a*) has at least one slide (7*a*) with a bearing and/or contact surfaces (17*a*, 21*a* or 31*a*, 35*a*) engaging in pretensioned manner in at least one working position, in which for at least one of the surfaces is provided a device (20, 20'), with which it is possible to vary the compressive stress acting on the surface as a function of the control path of the slide. For example, piston lips (18*a*, 22*a*) can be relived in the rest position for reducing temperature-dependent deformation tendencies, or a valve closing stress can be increased or decreased.

33 Claims, 2 Drawing Sheets

Fig. 2
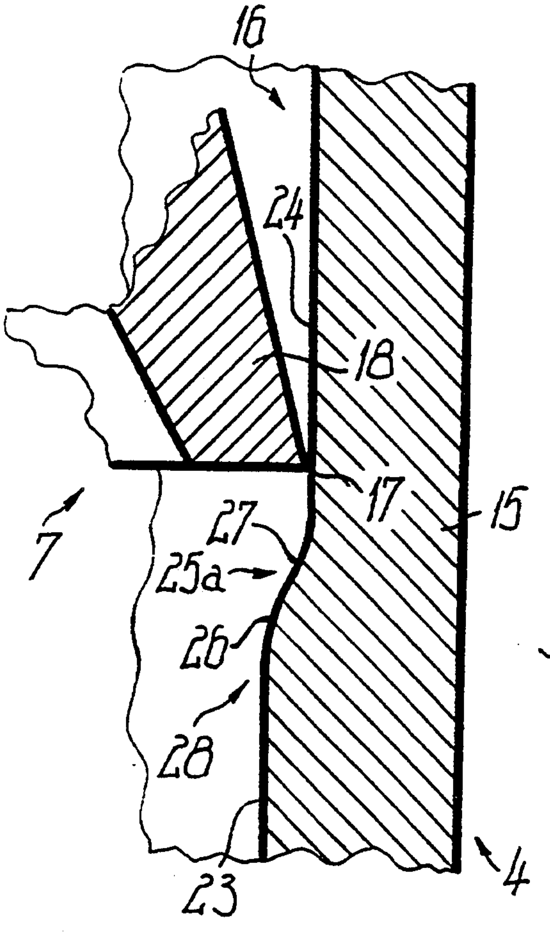
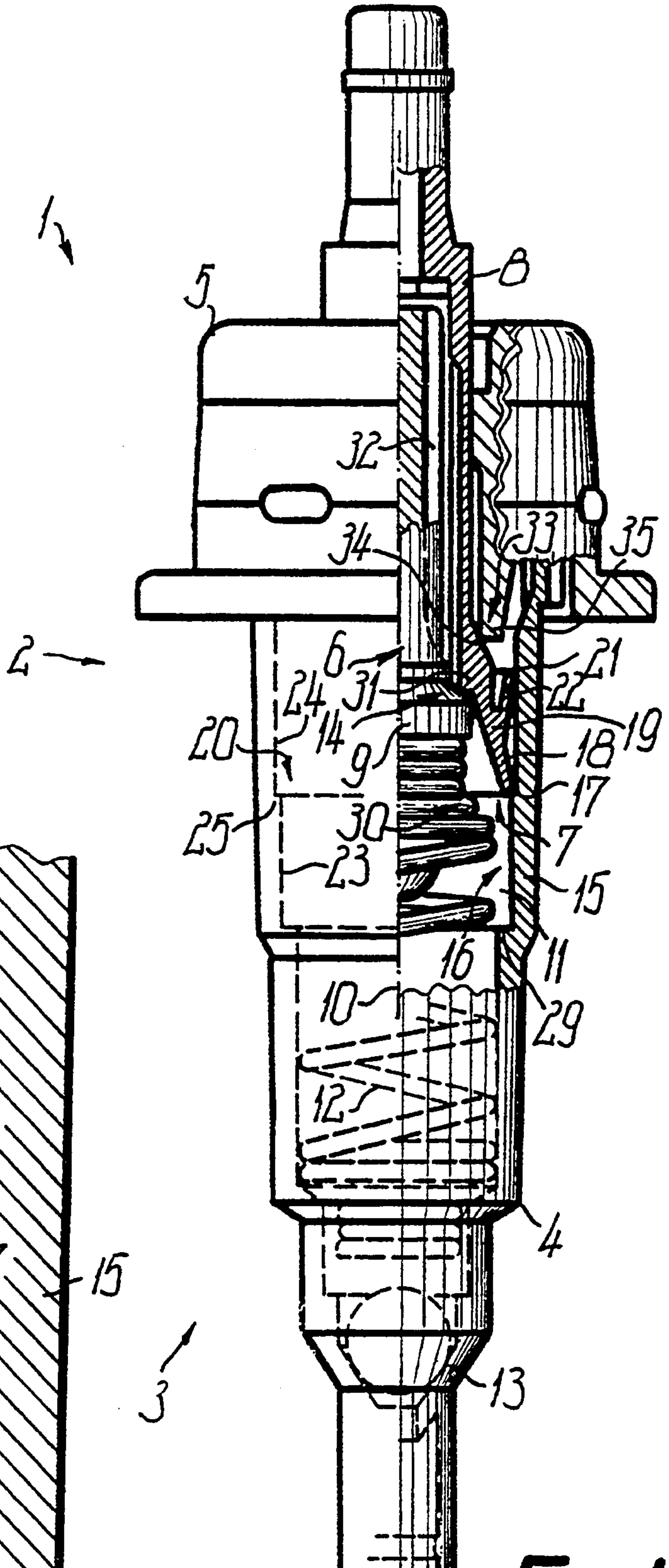
Fig.1

MEDIA DISPENSER WITH INITIAL PRESSURE-RELIEF STATE

BACKGROUND OF THE INVENTION

The invention relates to a discharge apparatus for media having a random aggregate state, but particularly for such media with respect to which it is relatively difficult to provide a seal, such as e.g. with liquids having high creeping characteristics or pasty, smeary media.

Appropriately the discharge apparatus has one or more slides bringing about functional sequences, which can e.g. be a pump piston, a piston-like valve slide, etc. The particular slide is advantageously displaceably located with at least one bearing or contact surface on a mating surface of a basic body or the like and with said bearing surface is loaded towards the mating surface with an operating compressive stress, under which it is guided on a portion of the mating surface, which forms the operating surface during its operating function. The slide also defines an inoperative or rest position.

If the slide is applied to the mating surface in the rest position with the same compressive stress as during its operating movement on the operating surface, then the part resiliently loading the bearing surface, like the latter is under the appropriately high stress or tension for the operating conditions, but which is not required in the rest position for maintaining the operational readiness of the discharge apparatus. This high tension in the rest position or starting position of the slide or discharge apparatus can lead to a reduction of the spring characteristics, if the discharge apparatus is not used for a long time, or is e.g. exposed to high temperatures, as a result of sunlight. The structure of the resilient area can change in such a way that under the rest stress or tension it can undergo a plastic or permanent deformation and consequently the compressive stress is significantly reduced. Particularly when using plastic parts in one-hand-operable discharge apparatuses, such a risk is relatively high. As a result of the reduced compressive stress the operational reliability of the discharge apparatus is no longer ensured.

The invention is also based on the problem of obviating the disadvantages of known constructions of the aforementioned type and in particular aims at providing a discharge apparatus permitting an adaptation of mechanical stresses or tensions on operational parts of the discharge apparatus, as a function of the condition requirements.

To solve this problem means are provided for significantly reducing the mechanical stress at least with respect to a component pretensioned for its function to the final, relatively small part of its movement to the rest postiion and preferably is brought almost to a zero stress, except for a very small residual stress. Therefore, particularly for long rest periods and/or storage or operation under very high temperatures, the discharge apparatus is eminently suitable, because one or more mechanical stress or tension members, in the rest position, are at the most under a mechanical stress which cannot lead to a permanent deformation at the temperatures of possibly more than 100° C., even if the resilient part is heated to the deformation temperature.

With regards to resilient and optionally relievable parts, besides substantially purely spring elements, the discharge apparatus can in particular have bearing or sliding members, such as are e.g. formed by sleeve-like and/or conical sealing lips, which as the bearing surface essentially only have a sharp ring edge, which is bounded by a circumferential surface and an end surface. Particularly those, optionally acute-angled bounded surfaces are, due to their limited material cross-section between the surface flanks, very sensitive to permanent deformation or tension overloading. This is particularly the case if the bearing surface or the resilient part is formed not by a rubber-elastic, inherently compressible material, but by a relatively hard or rigid material, which under the operating loads which occur is not elastically compressed, but is to be deformed in a bending-elastic manner.

If only one bearing surface is to be protected against permanent deformation, the relieving means can e.g. be formed in that the bearing surface over part of its extension in the rest position is loaded over a control surface away from the mating surface and is therefore relieved in its engagement area, without the mating surface, including the rest surface having to diverge from a continuous path. Particularly, if instead of or in addition a part acting resiliently on the bearing surface is to be relieved, then the control surface is appropriately directly formed by the mating surface in such a way that in the rest position the bearing surface at least partly comes entirely free from the mating surface and/or at least partly only engages with said minimum compressive stress. However, the bearing surface is appropriately completely covered in the rest position by the mating surface and for this purpose forms a corresponding set back rest surface, which passes via a transition surface into a working surface, on which the bearing surface is guided over most of the operating movement of the slide.

So that even in the case of very sensitive bearing surface, the transition surface ensures a gentle transition between the tension or stress states, particularly on increasing the compressive stress, the transition surface is appropriately very flat and is free from linear portions in cross-section, where it rises to the operating surface.

The inventive construction is particularly suitable for pump pistons or valves of thrust piston pumps, such as are e.g. described in DE-OS 37 15 300, to which reference should be made with respect to the incorporation of features and actions into the present invention.

The inventive construction is also suitable for relieving at least one valve body of at least one valve, e.g. an outlet or delivery valve and/or for increasing the closing stress of at least one valve, such as a vent valve. For this purpose the control surface can be provided in such a way that the closing stress of the outlet valve in the rest position of the discharge apparatus is slightly reduced, because in this starting position the pump chamber is substantially pressureless. In the case of a vent valve the control surface can be provided in such a way that the closing stress, following a first contact of the associated valve closing faces, is increased again, which leads to a very good sealing of the pump casing to the outside. The said stress-increasing or decreasing functions can optionally be achieved by a single control surface, e.g. if a working piston forms both one or more sealing lips and one or more valve bodies and has material cross-sections and dimensions such that the tension forces acting radially on the particular bearing surface are transferred to the valve body.

These and further features can be gathered from the claims, description and drawings and the individual features, both singly and in the form of sub-combinations, can be realized in an embodiment of the invention and in other fields and can represent advantageous, independently protectable constructions for which protection is hereby claimed. Embodiments of the invention are described in greater detail hereinafter relative to the drawings, wherein show:

DESCRIPTION OF THE DRAWINGS

FIG. 1 An inventive discharge apparatus, partly in axial section.

FIG. 2 A detail of FIG. 1 on a much larger scale and in slightly modified form.

DETAILED DESCRIPTION OF THE PREFERRED EMBODIEMENTS

Figure 3:
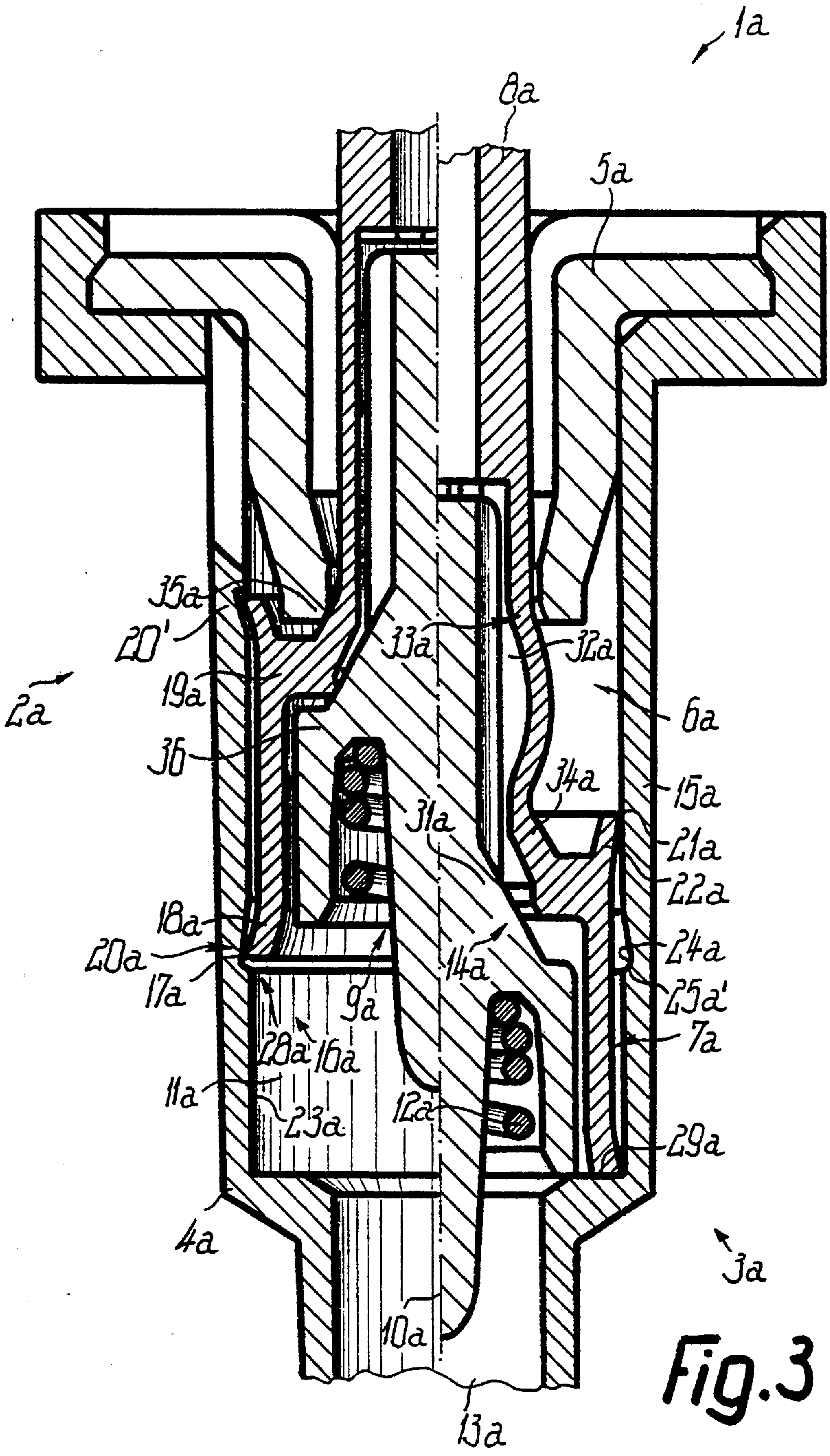
FIG. 3 Another embodiment in axial section and in two operating positions.

The represented discharge apparatus 1 has several discharge units 2 to be fixed in sealed manner to a medium reservoir or which can be formed into a closed subassembly. The unit is substantially formed by a thrust piston pump 3, which over most of its length projects in flush manner through a filling opening into the reservoir in such a way as to close the latter.

The discharge unit 2 can have one or more pumps with at least partly common or separate casing 4, which is appropriately constructed in a stepped, sleevelike and substantially axially symmetrical manner and at the remote end located outside the medium reservoir is closed with a cross-sectionally circular cylinder cover 5. The cylinder cover 5 engaging over the end of the casing 4 can be so supported with a ring flange provided at its inner end on an end face of a reservoir neck that the remaining casing 4 projects into the reservoir. In the casing 4 and in the cylinder cover 5 is axially displaceably mounted one or more piston units 6, which in each case have one or slides, e.g. a slide 7 constructed as a pump piston, which can be operated by a plunger 8 guided to the outside through the cylinder cover 5. The sleeve-like, hollow slide 7 multiply stepped on the inner and outer circumference and made from bending-elastic material internally receives a substantially inelastic, shaft-like piston core 9 which, like substantially all the remaining components, is located approximately in the axis of the pump 3. With part of the interior of the casing 4, the slide 7 bounds a pump chamber 11 and with a restoring or return spring 12 located therein is axially loaded to the starting or rest position of the discharge unit 2 shown in FIG. 1.

In the vicinity of the inner, narrower end in the casing 4 and the pump chamber 11 is provided an intake valve 13, e.g. a ball valve controlled in pressure-dependent manner, by means of which medium can be sucked into the pump chamber 11 through a riser from the bottom area of the reservoir during the return stroke or travel of the slide 7. An outlet valve 14 is constructionally combined with the piston unit 6 and its valve spring acting towards the closing position is formed by the return spring 12 and its two valve bodies are constructed in one piece with the slide 7 and the piston core 9. The valve or return spring 12 engages directly on an inner mandrel end of the piston core 9, which is located with a shaft portion within the plunger 8 and with the latter bounds an outlet channel, into which the medium is fed in pressure and/or path-dependent manner from the pump chamber 11.

By means of a part of its length approximately connected to the cylinder cover 5, the casing jacket 15 of the casing 4 forms with its inner circumference a mating surface 16 for the slide 7 by means of which the return spring 12 projects in the direction of the pump inlet, so that the intake valve 13 is axially spaced from the mating surface 16. During pumping the slide 7 runs with an annular bearing surface 17 in substantially sealed manner on the mating surface 16, said bearing surface 17 being the front bearing surface in the pump stroke movement direction and with which the slide 7 engages in sealed manner in the mating surface 16. This bearing surface 17 is formed by a frustum-shaped piston lip 18 projecting freely in said direction and which is conically widened more on the inner than on the outer circumference and which has such a small jacket thickness, that without corrugating deformations it is resiliently constricted in the vicinity of the bearing surface mations it is resiliently constricted in the vicinity of the bearing surface 17 and can consequently be engaged with radial inherent tension and without additional spring support on the mating surface 16. The piston lip 18 is formed in one piece by the front end of a cross-sectionally annular piston packing 19, which following onto the piston lip 18 has an increased jacket thickness and passes in one piece into the plunger 8 axially spaced from the slide 7. The outer end of the plunger 8 is constructed as a plug-in member for the engagement of an operating and discharge head, which has a discharge opening and forms an operating handle for moving the piston unit 6.

At least one bearing surface or piston lip of the slide 7 is associated with a relieving device 20 in such a way that in the stop-limited starting position and/or in some other e.g. locked intermediate or end position the latter is relieved from the radial stress at least on part of its circumference. This can take place without any deformation of the piston lip 18, e.g. in that the stress with which the bearing surface 17 is engaged is reduced or that at least on one part of the circumference the bearing surface is so relieved by a springing back construction of the mating surface 16, that an e.g. circular bearing surface 17 is brought into a different, e.g. oval shape, in which substantially all the remaining circumferential areas of the bearing surface 17 engage with limited stress on the mating surface 16 or are even raised therefrom so as to form a gap. On part or the entire circumference there is a relieving of the radial stress or tension acting on the bearing surface 17 and the piston lip 18 compared with the radial stress or tension occurring during most of the pump stroke or when a medium is pressurized.

For forming the relieving device 20 in this case the mating surface 16 forms a working surface 23 and a rest surface 24 axially connected thereto by means of a transition surface 25 and one or more of these surfaces is appropriately uninterrupted and uniform over the circumference and axial extension, being closed, so that the bearing surface 17 on engagement therein is always uniformly radially loaded over its circumference. Instead of being formed as an outer circumference, the bearing surface 17 can also be formed as an inner circumference and in this case the mating surface 16 would be an outer circumference. All the surfaces are appropriately cross-sectionally circular, so that the working surface 23 and/or the rest surface 24 is cylindrical. The rest surface 24, on whose end facing the working surface 23 engages the bearing surface 17 in the rest position, has a larger width than the working surface 23 by a few 100ths mm, so that it is set back relative to the working surface 23 with respect to the bearing surface 17. The transition surface 25 forms a ring shoulder at the lower end of the working surface 23. In a corresponding construction, the bearing surface 17 can be constructed as an approximately planar surface at right angles to the axis 10 or as a frustum-shaped surface, which passes in acute-angled manner into the working surface 23 and/or the rest surface 24. Thus, the mating surface 16 forms a control surface 28 for modifying the pressure acting on the bearing surface 17 as a function of the axial position of the bearing surface 17 relative to the mating surface 16.

Immediately with or fractions of a millimeter after the start of the working stroke of the slide 7, with a constant increase of the radial tension acting on it the bearing surface 17 operates in a transition state and slides along the transition surface 25, whose inclination is smaller than its width by at least one power and in particular by between 1/20 and 1/40. At the end of the transition surface 25 the bearing surface 17 slides on the working surface 23, which has a substantially constant width over its length. As the piston lip 18 with a closed delivery valve 14 is constructed as a cup-shaped hollow piston open to the pump chamber 11, pressure increases in the latter additionally help to increase the contact pressure of the bearing surface 17. Therefore the relieving device 20 acts purely mechanically and independently of the pressure-dependent control of the contact pressure. During the return travel of the slide 7, at the end the bearing surface 17 again jumps over the transition surface 25 on the rest surface 24 into its circumferentially uniformly mechanically relieved relief position.

FIG. 2 shows a very suitable construction of the control surface 28 for very sharp-edged bearing surfaces 17 guided in scraping manner along the mating surface 16. Here the transition surface is **25*a*, S-shaped, the two opposite curvature portions 26, 27 being roughly equal and tangentially directly connected to one another and/or to the working surface 23 or the rest surface 24, so that a linear intermediate portion between the curvature portions 26, 27 is avoided. Thus, the tension of the bearing surface 17 initially increases progressively at the start of the working stroke and then increases at a lessor rate up to the reaching of the working surface 23, which greatly protects the bearing surface 17. In other words, as can be best understood by referring to FIG. 2, when the bearing surface 17 contacts rest surface 24, there is an initial minimal stress on bearing surface 17. As the bearing surface 17 moves downward, the bearing surface 17 encounters transition surface 25*a* and a transition stress which is greater than the initial stress which tends to push bearing surface 17 inward. Once the bearing surface 17 moves below the transition surface 25*a*, the bearing surface encounters working surface 23 and an associated operating stress which is greater than the transition stress. The material characteristics of the piston lip 18 are selected in such a way that its bearing surface 17 cannot be cross-sectionally deformed by its contact pressure, that the thrust forces occurring circumferentially within its jacket due to the elastic constriction of the piston lip 18 can be absorbed in rubber-ellastic manner and can consequently not lead to corrugations or to circumferentially distributed zones in which the bearing surface 17** engages with different radial tension.

In axial spaced manner behind the bearing surface 17, the slide 7 has a further bearing surface 21 and/or a piston lip 22, for which the explanations provided in connection with the bearing surface 17 and piston lip 18 apply. However, the piston lip 22 projects axially counter to the piston lip 18, surrounds a central axial portion of the piston packing 19 with radial spacing and can be shorter than the piston lip 18. Between the bearing surfaces 17, 21 the slide 7 is not in contact with the mating surface 16 in any position, even if the slide 7 runs over the transition surface 25 or **25*a*. Thus, the bearing surface 21 can always run in path-independent manner and with a constant contact pressure on the rest surface 24, or e.g. on the final part of the working stroke can come into the vicinity of the transition surface 24 or, even accompanied by an increase in its radial stress, can pass onto the working surface 23, if e.g. the axial spacing between the bearing surfaces 17, 21 is roughly the same or smaller than the working stroke. For the bearing surface 21 or the piston lip 22 it is also possible to provide a further relieving device, which e.g. has substantially the same construction as the device 20. In this case the rest surface 24 would serve as a working surface for the bearing surface 21** and would pass via a transition surface into a further widened rest surface.

For the precise determination of the working stroke a control device 30 is provided, which e.g. has a stop surface 29 acting directly on the front end of the slide 7 or the piston lip and/or the bearing surface 17 and which is located on the end of the working surface 23 remote from the transition surface 25 and in the form of an inner ring shoulder. At the end of the working stroke, the front face of the piston lip 18 strikes circumferentially and uniformly on the stop surface 29 whereas, as a result of the pressure-elastic construction of the plunger 8, the piston core 9 moves on somewhat, so that the outlet valve 14 opens counter to the tension of the return spring 12 and the medium is delivered from the pump chamber 11 under pressure by the plunger 8 or the outlet channel 32.

The inner circumference of the piston packing 19 forms a circular valve body 31, which can be radially resiliently slightly widened under the valve forces. The valve body 31 forms an appropriately sharp-edged closing surface, with which is associated a frustum-shaped valve seat on the piston core 9 and which is spaced between the ends of the piston lip 22 or between the bearing surfaces 17, 21 and is closer to the bearing surface 21. The inner circumference of the piston lip 18 passes substantially continuously up to the valve body 31 and is connected to a ring shoulder forming the associated flank of the valve closing face. The relief of the bearing surface 17 or 21 can consequently bring about a corresponding radial relief of the valve closing face, so that in the rest position is contact pressure against the valve seat is reduced.

During the working stroke the device 20 acts to increase the tension on the bearing surface 17. Correspondingly a device or the device 20 can also be provided for increasing a tension or stress of at least one functional part of the discharge unit 2 in the rest position, e.g. the closing stress of a vent valve 33, which is used for venting the medium reservoir through the casing 4 and whilst bypassing the pump chamber 11. Here again the associated valve body 34 is constructed in one piece with the piston packing 19 or the plunger 8 and its closing face is axially immediately behind the bearing surface 21 or the closing face of the valve body 31, which can form with the valve body 34 a through, reinforced jacket area of the packing 19, to which is connected to the rear the much weaker and pressure-elastic, compressible portion of the plunger 8. With the changes in the same direction lead in the case of the bearing surfaces 17, 21 or the valve body 31 to opposing stress changes compared with the valve body 34, so that the relieving of the bearing surfaces or the valve body 31 can cause an increase in the closing stress of the valve 33, which leads to a very reliable sealing of the vent connection in the rest position along the outer circumference of the plunger 8 through the cylinder cover 5 and leading into the open. The valve closing face of the valve body 34 is also frustum-shaped. The valve seat is constituted by a projection of the cylinder cover 5 projecting freely in sleeve-like manner into the casing 4.

The rest position of the bearing surface 17 or 21 with respect to the casing 4 is stop-defined, the circular stop face of the slide 7 being positioned axially immediately adjacent to at least one bearing surface 21 and can advantageously be formed by the valve closing face of the valve body 34. Therefore the projection forming the associated valve seat serves as a casing-fixed counter-stop 35 and the position of the bearing surface 17 or 21 is precisely fixed in the rest position with respect to the control surface 28.

According to FIG. 3 the piston lip 18*a* has roughly the same length or a greater length than ½ or ⅔ of its diameter. Over most of the said length it is cylindrical on the inner and/or outer circumference, which gives a relatively large, resilient lever length. The piston lip 22*a* has a much smaller length and is smaller than 1/6 of its diameter. The closing face of the valve 14*a* is connected axially roughly to the rear end of the piston lip 18*a*, whilst the closing face of the valve 33*a* is located between the bearing faces 17*a*, 21*a* or in the vicinity of the piston lip 22*a* and is connected to the face of the portion of the piston packing 19*a* remote from the seat of the valve 14*a* and which has much larger radial cross-sections than the sealing lip. To the left in FIG. 3 can be seen the inoperative position and to the right the pump stroke end position. Otherwise in FIG. 3 the same reference numerals are used as in FIG. 1, but followed by the letter a, so that all description parts apply to all embodiments and whose features or constructions can be provided in a single discharge apparatus or unit.

For the bearing surface 17*a* and the piston 18*a* is provided as the relief device 20*a* a circular groove on the inner circumference of the mating surface 16*a*, one flank of the circular groove diverging in acute-angled manner towards the transition surface 25*a* that the outer circumference of the piston lip 18*a* cannot engage on it. This flank then passes via the roughly quadrantally rounded transition surface 25*a'* into the working surface 23*a* roughly at right or obtuse angles and optionally in sharp-edged manner. A further, separate relief device 20' is provided for the bearing surface 21*a* or the piston lip 22*a* and is also constructed as a circular groove passing continously or discontinuously over the circumference and whose groove flank to be overrun during the working stroke converges in acute-angled manner towards the working movement. In place of the diverging groove flanks, the two grooves axially spaced from one another can also pass into one another via an e.g. cylindrical circumferential surface, which is connected to the deepest areas of the two circular grooves and consequently forms the bottom of a very flat, through groove.

Apart from a central mandrel, the piston core 9*a* has a cup portion 36, which is only open to the front and which surrounds its rear end with a radial spacing, the outer circumference of portion 36 only having a gap with respect to the inner circumference of the piston lip 18*a*, but is shorter than the latter, so that the free, circular face of the cup portion 36 with the valve 14*a* closed is spaced behind the free face of the slide 7*a*. After during the working stroke said front face has struck against the stop face 29*a*, the core body 9*a* is further displaced accompanied by the compression of the portion of the plunger 8*a* surrounding its shaft until its face engages on the stop face 29*a* and consequently the valve 14*a* is mechanically opened, also independently of the pressure in the pump chamber 11*a*. The rear end of the return spring 12*a* is located with the front circular groove, which is bounded by the mandrel extension and the cup portion 36 of the core body 9*a*, the mandrel extension projecting forwards over the cup portion 36 passing through the central opening, which is bounded on the outer circumference by the stop face 29*a* or the casing 4*a*.

The two bearing surfaces 17*a*, 21*a* can have different widths, e.g. in such a way that the bearing surface 21*a* is wider than the bearing surface 17*a*. If the valve closing face or the associated bodies of the valves 14*a*, 33*a* are the areas to be relieved, then they can be relieved as described relative to the bearing surfaces and in the represented embodiment the relieving of these surfaces takes place indirectly and not by direct engagement thereof in a rest surface.

We claim:

1. A dispenser for discharging media, said dispenser being operable between an unoperated, initial state, a transition state, and at least one pressurized operating state, said dispenser comprising:

a pressure chamber (11) bounded by a mating surface (16), said pressure chamber (11) being subjected to an operating pressure during said operation state;

a thrust member (7) having at least one operating surface (17, 21) that is movable through a control motion between i) an initial position corresponding to said initial state of said dispenser, ii) a transition position corresponding to said transition state of said dispenser, and iii) an operating position corresponding to said pressurized operating state of said dispenser;

said transition position being connected substantially directly to said initial position and said operating position being connected substantially directly to said transition position;

wherein said mating surface (16) is engaged by said operating surface (17, 21) with an initial stress when said dispenser is in the initial state, said mating surface (16) is engaged by said operating surface (17, 21) with a transition stress sealing said pressure chamber (11) when said dispenser is in the transition state, and said mating surface is engaged by said operating surface with an operating stress that seals against said operating pressure in said pressure chamber (11) when said dispenser is in the pressurized operating state, said initial stress, said transition stress, and said operating stress defining sealing stresses, said transition stress and said operating stress including a compressive stress; and wherein control means (20, 20*a*, 20') are provided for interengaging said at least one operating surface (17, 21) and said mating surface (16, 16*a*) in said initial position with said initial stress substantially lower than said transition stress and substantially lower than said operating stress and to positively increase said stress from said initial stress on said operating surface (17, 21*a*) to said transition stress and from said transition stress to said operating stress on said operating surface (17, 21*a*) so as to minimize deformation of said operating surface (17, 21*a*) when in said initial position.

2. The dispenser according to claim 1, wherein said operating surface (17, 21*a*) provides a sliding surface operable in a return motion that is counter to said operating motion, said control means (20, 20*a*, 20') being provided for reducing said operating stress from a small final section of said return motion to only a residual stress near a zero stress value.

3. The dispenser according to claim 1, wherein said operating surface (17, 21*a*) provides a closing surface for operationally opening and closing said pressure chamber (11), said control means being provided for increasing said stresses when said pressure chamber (11) is closed.

4. The dispenser according to claim 1, wherein said operating surface (17, 21*a*) is operationally displaceable along said mating surface (16) over a thrust path defined by a plurality of motion sections, said control means (20) operating at least partly mechanically to vary said sealing stresses as a function of said control motion, said operating stress being substantially constant over at least one of said motion sections, with said operating surface (17, 21) remaining uncorrugated in said transition state and in said pressurized operating state.

5. The dispenser according to claim 4, wherein said control surface is a surface section of a sealing surface (23) and a rest surface (24) is provided by said mating surface (16), said surface section providing a transition surface (25), said at least one operating surface (17, 21) defining a surface around an inner circumference that is uniformly loaded by said operating stress.

6. The dispenser according to claim 5 wherein in said initial position, said at least one operating surface (17) is located directly adjacent to said transition surface (25) leading to said sealing surface (23).

7. The dispenser according to claim 6 wherein an abutting face (29) is provided for stopping said at least one operating surface (17) at a forward end of said control motion, said abutting face engaging said operating surface (17), said abutting face (29) connecting to said transition surface (25).

8. The dispenser according to claim 7, wherein said abutting face (29) is provided at a remote end of said sealing surface (23), said remote end being spaced from said rest surface (24).

9. The dispenser according to claim 7, wherein said abutting face (29) is an activating face for activating discharge of the media.

10. The dispenser according to claim 7, wherein said thrust member (7) provides a discharge control member operable by abutting said abutting face (29).

11. The dispenser according to claim 7, wherein valve control means (30) are provided and include a control member providing at least one of said operating surfaces (17, 21), said abutting face (29) providing a control face of said valve control means (30) and axially fixing said control member in an abutting condition, thereby activating said valve control means.

12. The dispenser according to claim 5, wherein said mating surface (16) provides an inner circumference and wherein said at least one operating surface (17) provides an outer circumference that is within said inner circumference, wherein said rest surface (24) is widened in diameter with respect to said sealing surface (23) at least over part of said circumference, said at least one operating surface (17) engaging said mating surface (16) substantially exclusively with a sharp edge (17), said operating stress being substantially constant up to an end position of said at least one operating surface (17).

13. The dispenser according to claim 5, wherein in cross-section said transition surface (25) is connected substantially tangentially to said rest surface (24) and said sealing surface (23) is located remote from said rest surface (24), said operating surface (17) engaging said rest surface (24) in said initial position.

14. The dispenser according to claim 5, wherein in cross-section said transition surface (25) forms an arcuate surface in at least one direction at a distance from said one rest surface (24) and said sealing surface (23).

15. The dispenser according to claim 5, wherein in cross-section said transition surface (25) provides at least one arc extending over an overall arc angle of substantially 45°.

16. The dispenser according to claim 5, wherein in cross-section at least one of said transition surface (25) provides contra-curved arc sections (26, 27) having substantially the same radii of curvature.

17. The dispenser according to claim 5, wherein in cross-section said transition surface (25) is substantially S-shaped.

18. The dispenser according to claim 5, wherein in cross-section said transition surface provides contra-curved arc sections (26, 27) substantially tangentially directly interconnected.

19. The dispenser according to claim 5, wherein said thrust member (7) is a pump piston and said mating surface (16) is a cylinder slide path, each of said sealing surface (23), said transition surface (25) and said rest surface defining a circumference and an axial length extension, said transition surface (25) and said rest surface (24) being uninterrupted and uniform over said circumference and said length extension.

20. The dispenser according to claim 1, wherein said mating surface (16) is widened by a step located directly adjacent to said at least one operating surface (17, 21') when in said initial position.

21. The dispenser according to claim 1, wherein said mating surface (16) is provided by a constructional component (4) having an open end, a widened section of said mating surface (16) extending substantially up to said open end.

22. The dispenser according to claim 1, wherein in said initial position said operating surface (17) is substantially free of said compressive stress.

23. The dispenser according to claim 23, wherein in said initial position said operating surface (17) sealingly engages said mating surface (16).

24. The dispenser according to claim 1, wherein said operating surface (17) is provided by an annular pressure edge.

25. The dispenser according to claim 1, wherein said operating surface (17) is provided by a sleeve-shaped hollow piston lip (18).

26. The dispenser according to claim 1, wherein in the vicinity of said operating surface (17), said thrust member (7) is constructed as an elastically resilient bending body defining a cross-sectional material thickness extension, said thrust member (7) being substantially pressure-stable over said thickness extension.

27. The dispenser according to claim 1, wherein at least two of said operating surfaces (17, 21) are provided on said thrust member (7) in axially spaced locations, said control means (**20, 20*a*, 20') being provided for relieving both of said operating surface (17', 21'**) from said operating stress when in said initial position.

28. The dispenser according to claim 27, wherein said operating surfaces are provided by oppositely projecting piston lips (18, 22).

29. The dispenser according to claim 27, wherein separate rest surfaces (**24*a*) are provided for receiving said operating surfaces (17*a*, 21*a*) in said initial position, when on said rest surfaces said operating surfaces (17*a*, 21*a***) being loaded by said initial stress.

30. The dispenser according to claim 1, wherein in an area axially spaced from said at least one operating surface (17) said thrust member (7) provides at least one valve body (31, 34).

31. The dispenser according to claim 30, wherein two of said valve bodies (31, 34) are provided on an inner and an outer circumference of said thrust member (7).

32. The dispenser according to claim 31, wherein at least one stop face is provided and formed by said thrust member (7) and said valve body (34).

33. The dispenser according to claim 30, wherein said initial position said thrust member (7) is abuttingly positioned by engagement of said valve body (34).

* * * * *

UNITED STATES PATENT AND TRADEMARK OFFICE
CERTIFICATE OF CORRECTION

PATENT NO. : 5,375,745

DATED : December 27, 1994

INVENTOR(S) : Stefan Ritsche

It is certified that error appears in the above-identified patent and that said Letters Patent is hereby corrected as shown below:

Title Page:
In the Abstract "relived" should be --relieved--.

Col. 3, line 1 "sub-combinations" should be --subcombinations--.

Col. 4, lines 19 and 20 Delete second appearance of "mations it is resiliently constricted in the vicinity of the bearing surface".

Col. 5, line 39 "surface is 25a" should be --surface 25a is--.

Col. 7, line 47 "piston 18a" should be --piston lip 18a--.

Col. 10, line 56 "claim 23" should be --claim 22--.

Signed and Sealed this

Eighteenth Day of April, 1995

Attest:

Bruce Lehman

BRUCE LEHMAN

*Attesting Officer*

*Commissioner of Patents and Trademarks*